(12) United States Patent
Choi et al.

(10) Patent No.: US 12,409,714 B2
(45) Date of Patent: Sep. 9, 2025

(54) DOCKING SYSTEM FOR VEHICLE AND BUILDING AND CONTROL METHOD THEREFOR

(71) Applicants: Hyundai Motor Company, Seoul (KR); Kia Corporation, Seoul (KR)

(72) Inventors: Ki Hyun Choi, Yongin-Si (KR); Hyung Sik Choi, Seoul (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 403 days.

(21) Appl. No.: 18/134,991

(22) Filed: Apr. 14, 2023

(65) Prior Publication Data

US 2024/0149653 A1    May 9, 2024

(30) Foreign Application Priority Data

Nov. 8, 2022  (KR) .................. 10-2022-0147831

(51) Int. Cl.
| | |
|---|---|
| *B60J 7/00* | (2006.01) |
| *B60J 5/04* | (2006.01) |
| *B60J 7/02* | (2006.01) |
| *B60J 7/12* | (2006.01) |
| *B60J 10/90* | (2016.01) |

(52) U.S. Cl.
CPC ............... *B60J 10/90* (2016.02); *B60J 5/047* (2013.01); *B60J 7/02* (2013.01); *B60J 7/1204* (2013.01)

(58) Field of Classification Search
CPC ... B60J 10/90; B60J 7/1642; B60J 7/00; B60J 10/00; B60J 7/02; B60J 7/022; B60J 7/024; B60P 3/34; B60P 3/39

USPC .............................. 296/26.04, 26.05
See application file for complete search history.

(56) References Cited

U.S. PATENT DOCUMENTS

| | | | |
|---|---|---|---|
| 6,565,143 B2* | 5/2003 | Okamoto ................ | B60P 3/341 |
| | | | 296/156 |
| 7,243,965 B2* | 7/2007 | King ...................... | B60J 7/1614 |
| | | | 296/26.06 |
| 7,695,048 B2* | 4/2010 | Hoffman .............. | B65G 69/008 |
| | | | 296/146.1 |

(Continued)

FOREIGN PATENT DOCUMENTS

| | | |
|---|---|---|
| DE | 102017011996 B3 | 3/2019 |
| KR | 10-2021-0130285 | 11/2021 |
| KR | 10-2369339 | 2/2022 |

OTHER PUBLICATIONS

CN119527157A and english translation; Su; Feb. 28, 2025 (Year: 2025).*

*Primary Examiner* — Roger L Pang
(74) *Attorney, Agent, or Firm* — Morgan Lewis & Bockius LLP

(57) ABSTRACT

A docking system for a vehicle and a building and a control method therefor, include a plurality of vehicle doors provided to enter the vehicle, a roof connected to an upper portion of each of the vehicle doors, and configured to be vertically lifted and lowered above and below the plurality of vehicle doors, wherein when the roof is lifted, an indoor space expands upward to connect the indoor space of the vehicle to an indoor space of the building into one space, and a sealing door respectively provided inside each of the vehicle doors, when the roof is lifted, which is rotated toward each of the vehicle doors to seal each of the vehicle doors and the roof.

20 Claims, 10 Drawing Sheets

(56) References Cited

U.S. PATENT DOCUMENTS

| | | | |
|---|---|---|---|
| 11,926,203 B2* | 3/2024 | Osborn | B60J 7/141 |
| 2018/0072214 A1* | 3/2018 | Stoetzl | B60J 7/024 |
| 2022/0227282 A1* | 7/2022 | Wise | B60P 3/34 |

* cited by examiner

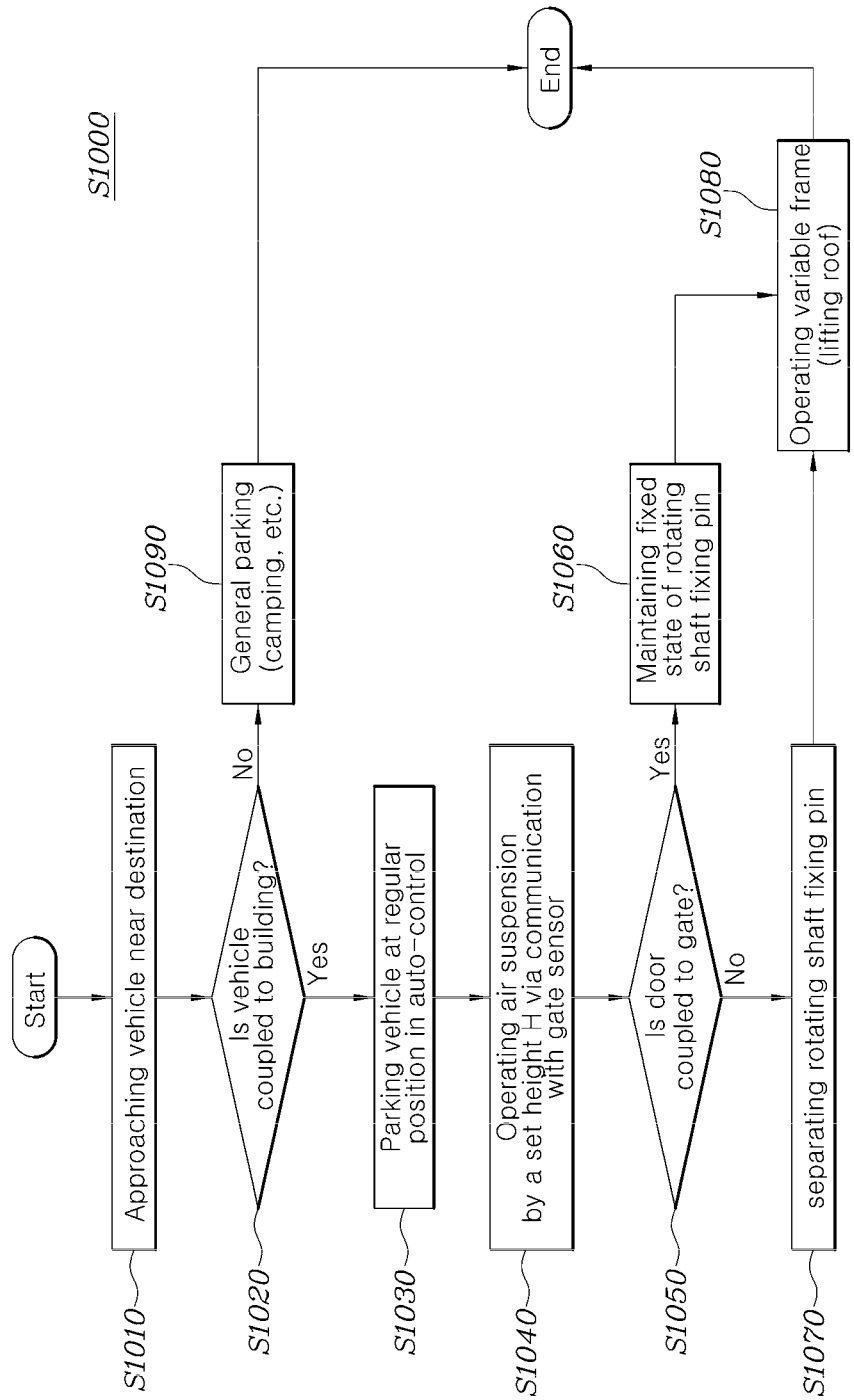

DOCKING SYSTEM FOR VEHICLE AND BUILDING AND CONTROL METHOD THEREFOR

CROSS REFERENCE TO RELATED APPLICATION

The present application claims priority to Korean Patent Application No. 10-2022-0147831, filed Nov. 8, 2022, the entire contents of which is incorporated herein for all purposes by this reference.

BACKGROUND OF THE PRESENT DISCLOSURE

Field of the Present Disclosure

The present disclosure relates to a docking system for a vehicle and a building and a control method therefor. More particularly, the present disclosure relates to a docking system for a vehicle and a building and a control method therefor, the docking system being capable of determining a docking direction and a non-docking direction in which the vehicle and the building are docked, and not docked and sealing a vehicle door regardless of whether or not the vehicle and the building are docked.

Description of Related Art

Recently, as interest in electric vehicles and autonomous vehicles has increased, various utilizes and forms of vehicles have been developed together. In the case of autonomous vehicles, connectivity between each vehicle and various other environments is important as passengers in the vehicle can freely move in the indoor space of the vehicle.

Accordingly, a concept in which the indoor space of the vehicle may be expanded and utilized as a residential space when the vehicle is docked with a building while the vehicle and the residential space are connected to each other is realistic possibility.

Meanwhile, when the indoor space of the vehicle and the indoor space of the building are just docked without being sealed in a parking state of the vehicle, external dust, noise, etc. may enter the vehicle, causing a problem in that it is difficult to use the indoor space of the vehicle as a residential space.

For example, with providing a plurality of vehicle doors, assuming that only a vehicle door on one side of the vehicle is docked with the building, the vehicle door may be sealed with a gate of the building in a docking direction of the vehicle and the building. However, while a vehicle door in a non-docking direction is not lifted, only the roof is lifted, causing a problem in that external dust, noise, etc. enter the vehicle via a gap between the roof and the vehicle door in the non-docking direction thereof.

Therefore, there is a demand for a method for determining a docking direction and a non-docking direction in which the vehicle and the building are docked and not docked to seal the vehicle door.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a docking system for a vehicle and a building and a control method therefor, the docking system being configured for determining a docking direction and a non-docking direction in which the vehicle and the building are docked and not docked, and of sealing a vehicle door in the docking direction with a gate of the building and sealing a vehicle door in the non-docking direction by exposing a sealing door.

The technical problem of the present disclosure is not limited to the above mention, and other problems not mentioned will be clearly understood by those skilled in the art from the description below.

To achieve the above technical objective, there is provided a docking system for a vehicle and a building, the docking system including: a plurality of vehicle doors provided to enter the vehicle; a roof connected to an upper portion of each of the vehicle doors, and configured to be vertically lifted and lowered above and below the plurality of vehicle doors, wherein when the roof is lifted, an indoor space may expand upward to connect the indoor space of the vehicle to an indoor space of the building into one space; and a sealing door respectively provided inside each of the vehicle doors, when the roof is lifted, which may be rotated toward each of the vehicle doors to seal each of the vehicle doors and the roof.

For example, the docking system may include: a controller configured to control each of the vehicle doors, the roof, and the sealing door.

For example, the controller may be configured to determine a direction in which the vehicle and the building may be docked with each other, and to rotate the sealing door in a non-docking direction.

For example, the controller may be configured to lift the roof while closing the sealing door in a docking direction of the vehicle and the building.

For example, the docking system may include: a fixed door provided inside the vehicle door, and connected to each sealing door via a rotation shaft at a lower end portion of the sealing door; a fixed frame provided at a lateral portion of the vehicle door, and including an internal space; and a variable frame slidably coupled to an upper portion of the fixed frame and configured to slide vertically above and below the fixed frame, wherein when the variable frame slides upward, the roof may be lifted and the indoor space expands upwards.

For example, when the roof is lifted up, while a lower end portion of the sealing door is fixed via the rotation shaft, an upper end portion thereof may be linearly moved in a direction from the inside space of each of the vehicle doors toward each of the vehicle doors on the rotation shaft.

For example, the docking system may include: a hydraulic cylinder provided in the internal space of the fixed frame, and provided below the variable frame, wherein the hydraulic cylinder is configured to allow the variable frame to slide vertically above and below the fixed frame.

For example, the docking system may include: a frame fixing pin inserted in the fixed door to be horizontally moved in a lateral direction of the vehicle door, and configured to fix the fixed frame or to release the fixed frame from a fixed state; and a rotation shaft fixing pin inserted in the rotation shaft to be horizontally moved in a lateral direction of each of the vehicle doors, and configured to fix the variable frame or to release the variable frame from a fixed state.

For example, the controller may be configured to control the frame fixing pin and the rotation shaft fixing pin.

For example, when the sealing door is rotated toward each of the vehicle doors, the controller may allow the frame fixing pin to be horizontally moved in a lateral direction of each of the vehicle doors to fix the fixed frame, and the controller may allow the rotation shaft fixing pin to be horizontally moved toward each of the vehicle doors to release the variable frame from a fixed state.

For example, when the sealing door is closed, the controller may allow the frame fixing pin to be horizontally moved toward each of the vehicle doors to release the fixed frame from a fixed state and allow the rotation shaft fixing pin to be horizontally moved in a lateral direction of each of the vehicle doors to fix the variable frame.

To achieve the above technical objective, there is provided a docking control method for a vehicle and a building, the docking control method including: receiving, by a controller, a docking request of the vehicle while parking of the vehicle is completed; determining, by the controller, a direction in which the vehicle and the building may be docked with each other, according to the received docking request; connecting, by the controller, an indoor space of the vehicle to an indoor space of the building into one space by lifting a roof of the vehicle so that the indoor space of the vehicle expands upward, while a sealing door in the docking direction of the vehicle and the building is closed; and sealing, by the controller, a vehicle door and the roof by rotating a sealing door in non-docking direction of the vehicle and the building toward the vehicle door.

For example, the docking control method may include: a fixed door provided inside the vehicle door, and connected to each sealing door via a rotation shaft at a lower end portion of the sealing door; a fixed frame provided at a lateral portion of the vehicle door, and including an internal space; and a variable frame slidably coupled to an upper portion of the fixed frame and configured to slide vertically above and below the fixed frame, wherein when the variable frame slides upward, the roof is lifted and the indoor space expands upwards.

For example, the docking control method may include: a frame fixing pin inserted in the fixed door to be horizontally moved in a lateral direction of the vehicle door, and configured to fix the fixed frame or to release the fixed frame from a fixed state; and a rotation shaft fixing pin inserted in the rotation shaft to be horizontally moved in a lateral direction of the vehicle door, and configured to fix the variable frame or to release the variable frame from a fixed state.

For example, the connecting, by the controller, the indoor space of the vehicle to the indoor space of the building into one space may include: allowing, by the controller, when the sealing door rotates toward the vehicle door, the frame fixing pin to be horizontally moved in a lateral direction of the vehicle door to fix the fixed frame; and allowing, by the controller, the rotation shaft fixing pin to be horizontally moved toward the vehicle door to release the variable frame from a fixed state.

For example, the sealing, by the controller, the vehicle door and the roof may include: allowing, by controller, when the sealing door is closed, the frame fixing pin to be horizontally moved toward the vehicle door to release the fixed frame from a fixed state; and allowing, by controller, the rotation shaft fixing pin to be horizontally moved in a lateral direction of the vehicle door to fix the variable frame.

According to the docking system for a vehicle and a building and the control method therefor, the docking system is configured to determine a docking direction and a non-docking direction of the vehicle and the building, seals the vehicle door in the docking direction with the gate of the building and seals the vehicle door in the non-docking direction by exposing the sealing door, so that ingress of external dust, noise, etc. may be prevented.

The effect of the present disclosure is not limited to the above mention, and other effects not mentioned will be clearly understood by those skilled in the art from the description below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 10 is a view showing a docking control process of a vehicle and a building according to the exemplary embodiment of the present disclosure.

Figure 1:
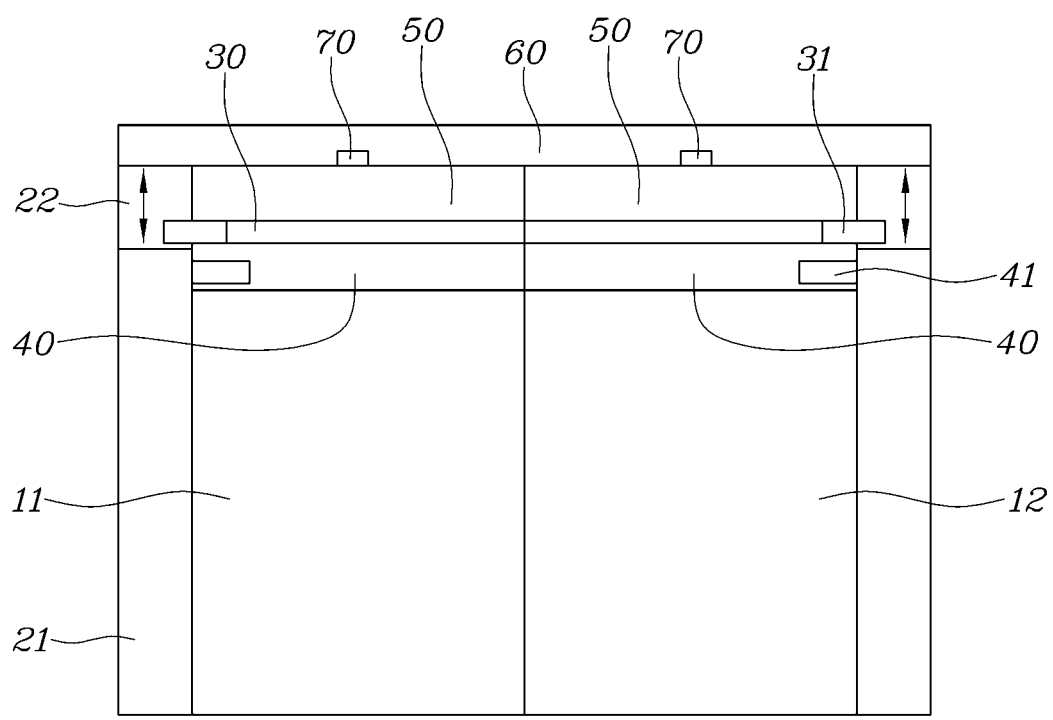
FIG. 1 is a view showing a structure of a docking apparatus of a vehicle and a building, according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, exemplary embodiments described in the specification will be described in detail with reference to accompanying drawings, and regardless of the reference numerals, the same reference numerals will refer to the same or like parts, and redundant descriptions thereof will be omitted.

The suffixes "module" and "part" for the components used in the following description are provided or mixed in consideration of only the ease of writing the specification, and do not have distinct meanings or roles by themselves.

In the following description, if it is decided that the detailed description of a known function or configuration related to the present disclosure makes the subject matter of the present disclosure unclear, the detailed description is omitted. Furthermore, the accompanying drawings are only for understanding of the exemplary embodiments of the present disclosure, and the technical ideas included in the specification are not limited by the accompanying drawings, and those skilled in the art will appreciate that various modifications, additions and substitutions are possible, without departing from the scope and spirit of the present disclosure as included in the accompanying claims. It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

According to an exemplary embodiment of the present disclosure, it is provided to determine a docking direction and a non-docking direction in which a vehicle and a building are docked and not docked, and to seal a vehicle door in the docking direction is sealed with a gate of the building and to seal a vehicle door in the non-docking direction by exposing a sealing door.

FIG. 1 is a view showing a structure of a docking apparatus of a vehicle and a building, according to various exemplary embodiments of the present disclosure. FIG. 1 mainly shows components related to the exemplary embodiment of the present disclosure, and it goes without saying that fewer or more components may be included in actual implementation of a vehicle.

Referring to FIG. 1, according to an exemplary embodiment of the present disclosure, a docking apparatus for a vehicle and a building may include a vehicle door 11, 12, a roof 200, and a sealing door 50.

A plurality of vehicle doors 11 and 12 may be provided, and for example, may be respectively provided at left and right portions of the vehicle. Each of the vehicle doors 11 and 12 is formed into a central opening and closing structure based on opposite lateral end portions of the door, and an upper end portion of the vehicle door 11, 12 may have a separate structure from the roof 200 to be independently moved from the roof 200, which will be described later.

The roof 200 may be connected to an upper portion of the vehicle door 11, 12, and may be vertically lifted and lowered above and below the vehicle door 11, 12. When the roof 200 is lifted, the indoor space expands upward so that the indoor space of the vehicle and the indoor space of the building may be connected to each other into one space. When docking of the vehicle and the building is released, the roof 200 is lowered so that the indoor space may be reduced downward. The roof 200 may be vertically lifted above a head lining 60 together with the head lining 60.

A fixed frame 21 may be provided at a lateral portion of the vehicle door 11, 12 and the fixed frame 21 may have an internal space. The fixed frame 21 may be formed in a height direction of the vehicle and may be configured to lift the roof 200. The fixed frame 21 may include a vehicle body 101 and a fixed trim 104, which will be described later, shown in FIG. 4, and the components are not changed in position thereof even when the roof 200 is lifted.

Furthermore, a variable frame 22 may be connected to an upper portion of the fixed frame 21 and may be provided in a space between the fixed frame 21 and the head lining 60. The variable frame 22 may include a moving panel 102 and a moving trim 103, which will be described later, shown in FIG. 4, and when the roof 200 is lifted, the variable frame 22 may slide vertically above and below the fixed frame 21. With upward sliding of the variable frame 22, the roof 200 is lifted to allow the indoor space to expand upwards. The vertical sliding of the variable frame 22 as described above may be achieved by a hydraulic cylinder 101 provided below the variable frame 22. The roof 200 is lifted by the hydraulic cylinder 101, and the hydraulic cylinder 101 is provided in the internal space of the fixed frame 21 and is provided below the variable frame 22, and allows the variable frame 22 to slide vertically above and below the fixed frame 21 so that the roof 200 may be lifted.

Furthermore, a fixed door 40, a rotation shaft 30, and the sealing door 50 are provided at an upper inside space of the vehicle door 11, 12 to seal the vehicle door 11, 12 and the roof 200 when the vehicle and the building are not docked with each other.

The fixed door 40 is provided at an inside space of the vehicle door 11, 12, and is fixed in a height direction of the vehicle to be connected to the sealing door 50 via the rotation shaft 30 at a lower end portion of the sealing door 50. When the sealing door 50 is closed and the roof 200 is lifted up, the fixed door 40 is lifted together with the roof 200 to secure the space for the head of a passenger during boarding and alighting. Furthermore, the fixed door 40 and the vehicle door 11, 12 are sealed via a weather strip 120 to prevent ingress of external dust, noise, etc. Furthermore, while the fixed door 40 is fixed, the rotation shaft 30 may allow the sealing door 50 to be rotated from the inside space of the vehicle door 11, 12 toward the vehicle door 11, 12.

The sealing door 50 is provided at the inside space of each vehicle door 11, 12, and when the roof 200 is lifted up, and the sealing door 50 is rotated toward the vehicle door 11, 12 to seal the vehicle door 11, 12 and the roof 200. Rotation of the sealing door 50 may be controlled by a controller. The controller may be configured to determine whether the vehicle and the building are docked with each other and a docking direction of the vehicle and the building. When the controller determines that the vehicle and the building are docked with each other, the controller may lift the roof 200 so that the indoor space expands upwards. Furthermore, determination, by the controller, of the docking direction of the vehicle and the building may be divided into determination whether docking is unidirectional or bidirectional. The determination will be described with reference to FIG. 2.

Figure 2:
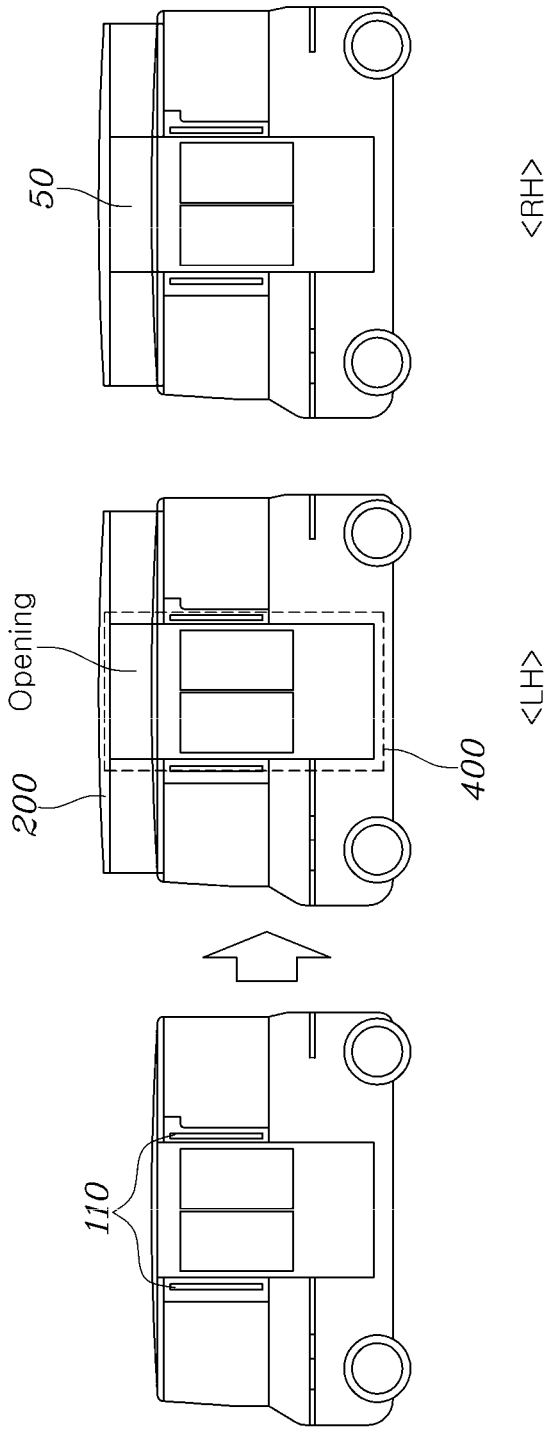
FIG. 2 is a view showing, when only one of vehicle doors according to the exemplary embodiment of the present disclosure is docked with the building, a sealing region of each of the vehicle doors.

FIG. 2 is a view showing a sealing region 400 of each vehicle door 11, 12, when only one vehicle door 11, 12 according to the exemplary embodiment of the present disclosure is docked with the building. Referring to FIG. 2, it is shown that the controller is configured to determine that the vehicle and the building are docked with each other in an unidirectional docking in which docking is performed at a left door LH, not a right door RH. Here, while the sealing door 50 inside the left door LH is closed, the controller lifts the roof 200, and rotates the sealing door 50 inside the right door RH, so that the vehicle door 11, 12 and the roof 200 are sealed. When the controller determines that the vehicle and the building are docked with each other in a bidirectional docking at both of the right door RH and the left door LH, while both of the sealing doors 50 inside the right door RH and the left door LH are closed, the controller lifts the roof 200. Specific rotation of the sealing door 50 will be described later.

Continuously, the structure of the docking apparatus of a vehicle and a building will be described.

A frame fixing pin 41 is provided by being inserted in the fixed door 40 and is horizontally moved in a lateral direction of the vehicle door 11, 12, so that the fixed frame 21 may fixed or released from a fixed state. When the frame fixing pin 41 is horizontally moved in the lateral direction of the vehicle door 11, 12, the fixed door 40 is connected to the fixed frame 21 to be in the fixed state. When the frame fixing pin 41 is horizontally moved back toward the vehicle door 11, 12 to be recovered to the initial state, the fixed state of the fixed door 40 and the fixed frame 21 are released. When the fixed door 40 is connected to the fixed frame 21 and the roof 200 is lifted, both of the fixed door 40 and the roof 200 are not lifted and the sealing door 50 is rotated.

Furthermore, a rotation shaft fixing pin 31 is provided by being inserted in the rotation shaft 30 and is horizontally moved in the lateral direction of the vehicle door 11, 12, so that the variable frame 22 may be fixed or released from a fixed state. The rotation shaft fixing pin 31 is horizontally moved in the lateral direction of the vehicle door 11, 12, the rotation shaft 30 is connected to the variable frame 22 to be in a fixed state. When the rotation shaft fixing pin 31 is horizontally moved back toward the vehicle door 11, 12 to be recovered to the initial state, the fixed state of the rotation shaft 30 and the variable frame 22 is released. Since the rotation shaft 30 is fixed at an upper portion of the fixed door 40, when the rotation shaft 30 and the variable frame 22 are connected to each other and the roof 200 is lifted, the variable frame 22 and the roof 200 are lifted so that the sealing door 50 is closed. Therefore, the controller is configured to control the frame fixing pin 41 and the rotation shaft fixing pin 31 so that the frame fixing pin 41 and the rotation shaft fixing pin 31 are horizontally moved in the lateral direction of the vehicle door 11, 12 to adjust opening and closing of the sealing door 50.

Hereinbelow, control of the vehicle door 11, 12 and the sealing door 50, when the controller determines that the vehicle and the building are docked in the unidirectional docking of the vehicle door 11, 12, will be described.

Figure 3:
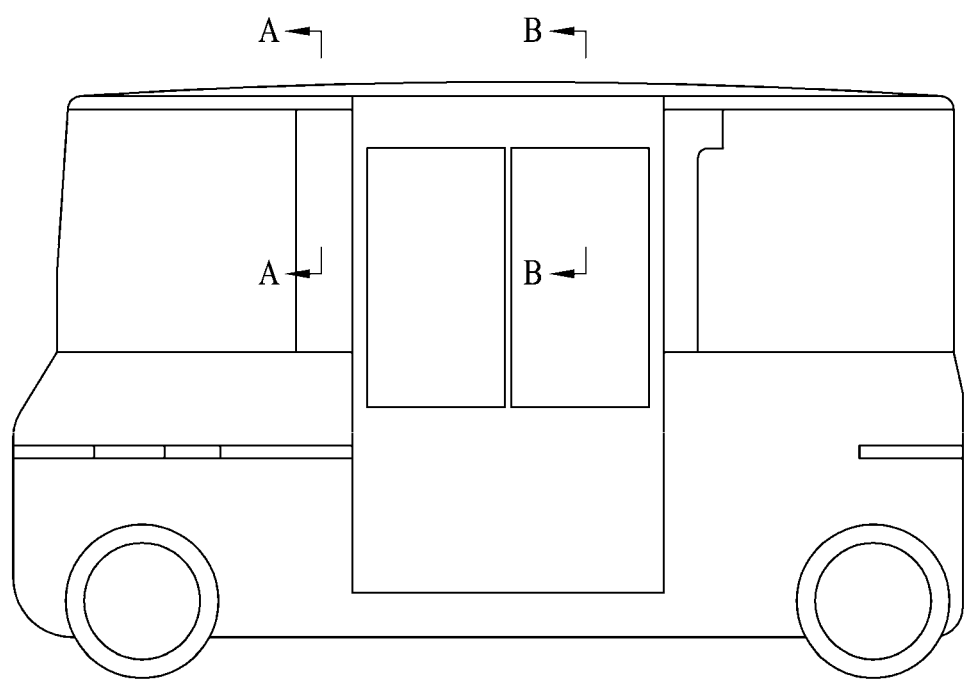
FIG. 3, FIG. 4, and FIG. 5 are views showing a section A-A and a section B-B during lifting a roof while the sealing door according to the exemplary embodiment of the present disclosure are closed.
Figure 4:
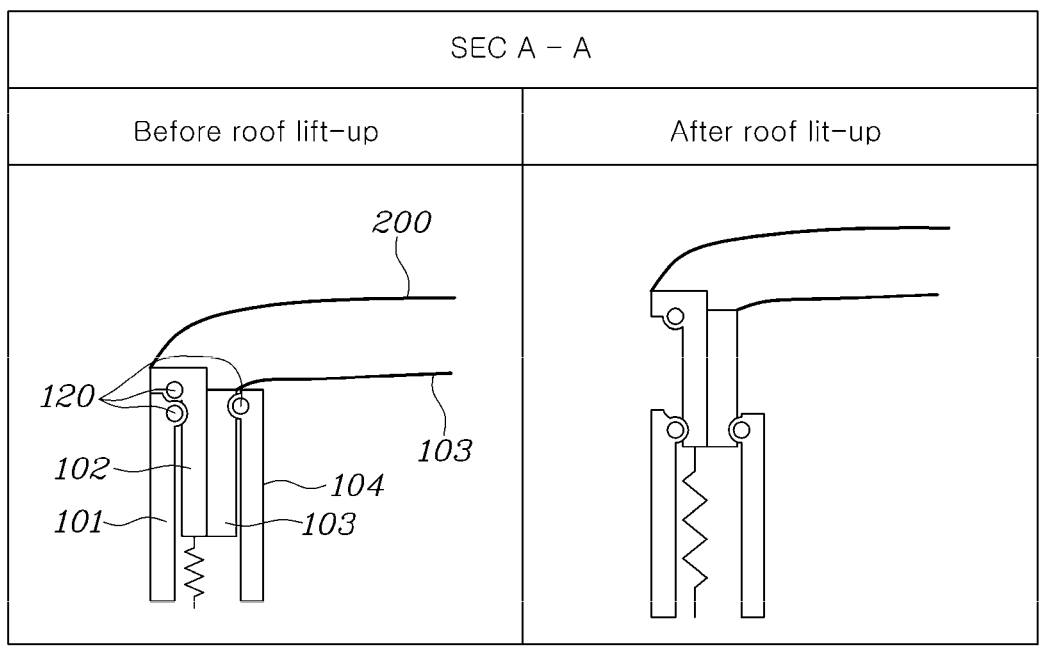
Figure 5:
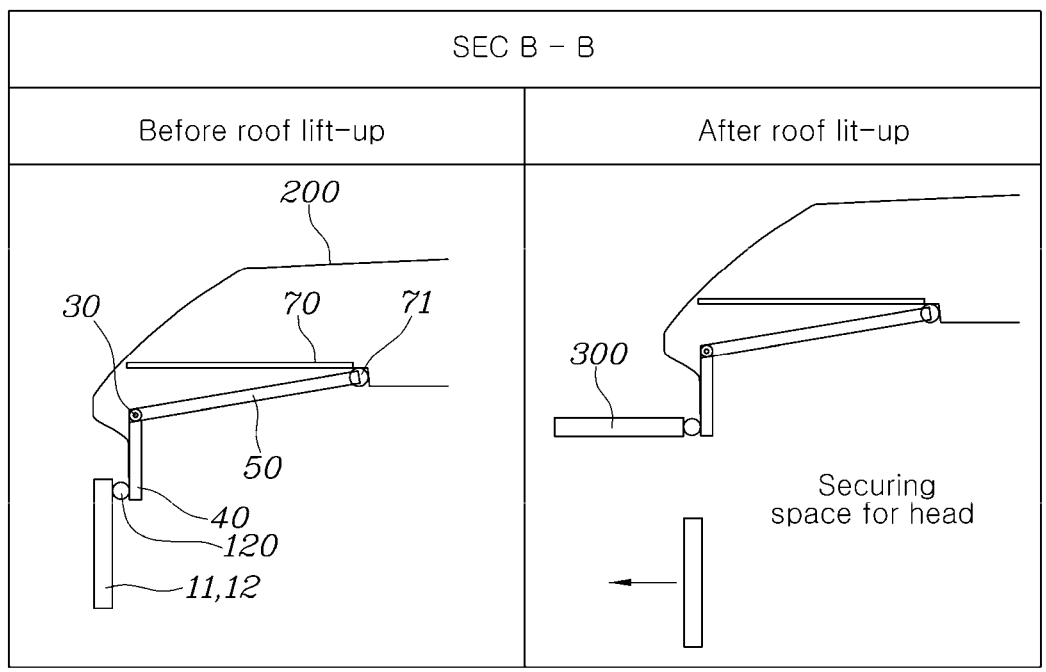

FIG. 3, FIG. 4, and FIG. 5 are views showing a section A-A and a section B-B during lifting a roof 200 while the sealing door 50 according to the exemplary embodiment of the present disclosure are closed.

The section A-A of FIG. 4 shows the fixed frame 21 and the variable frame 22 at a lateral side of the vehicle door 11, 12. As shown in FIG. 4, for the indoor space to expand upward, when the roof 200 is lifted, the moving panel 102 is disposed inside the vehicle body 101, and to secure the external shape and the sealing performance of the indoor space, the moving trim 103 may be mounted to the internal space of the moving panel 102. When the roof 200 is vertically lifted, the roof 200, the moving panel 102, and the moving trim 103 are simultaneously lifted. The hydraulic cylinder 101 is coupled to a lower portion of the moving panel 102, pushing the roof 200, the moving panel 102, and the moving trim 103 upwards. The weather strip 120 may be disposed to all the moving panel 102, the vehicle body 101, and the fixed trim 104, securing the sealing performance of the vehicle door 11, 12.

The section B-B in FIG. 5 shows the fixed door 40 and the sealing door 50 at the vehicle door 11, 12. As shown in FIG. 5, the controller is configured to allow the frame fixing pin 41 to release the fixed state of the fixed frame 21, and the rotation shaft fixing pin 31 to fix the variable frame 22, while the sealing door 50 is maintained in a closed state, the controller may lift the fixed door 40 and the sealing door 50 together with the roof 200. At the present point, when the indoor space of the vehicle and the indoor space of the building are connected to each other by a gate 300, a gap between the vehicle door 11, 12 and the roof 200 may be maintained in an empty exposed state to secure the head space. At the present point, the vehicle door 11, 12 and the building may be maintained in a sealed state by the weather strip 120 provided in the fixed door 40.

Figure 6:
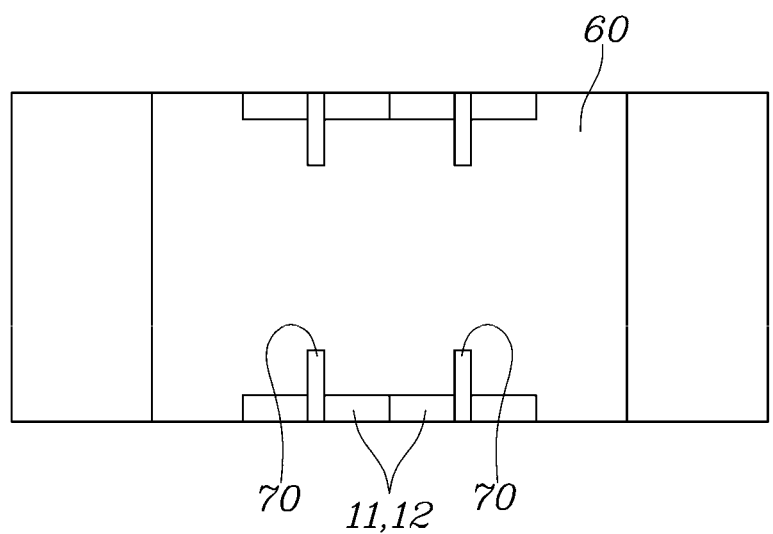
FIG. 6 is a top view showing the docking apparatus of a vehicle and a building in FIG. 2.
Figure 7:
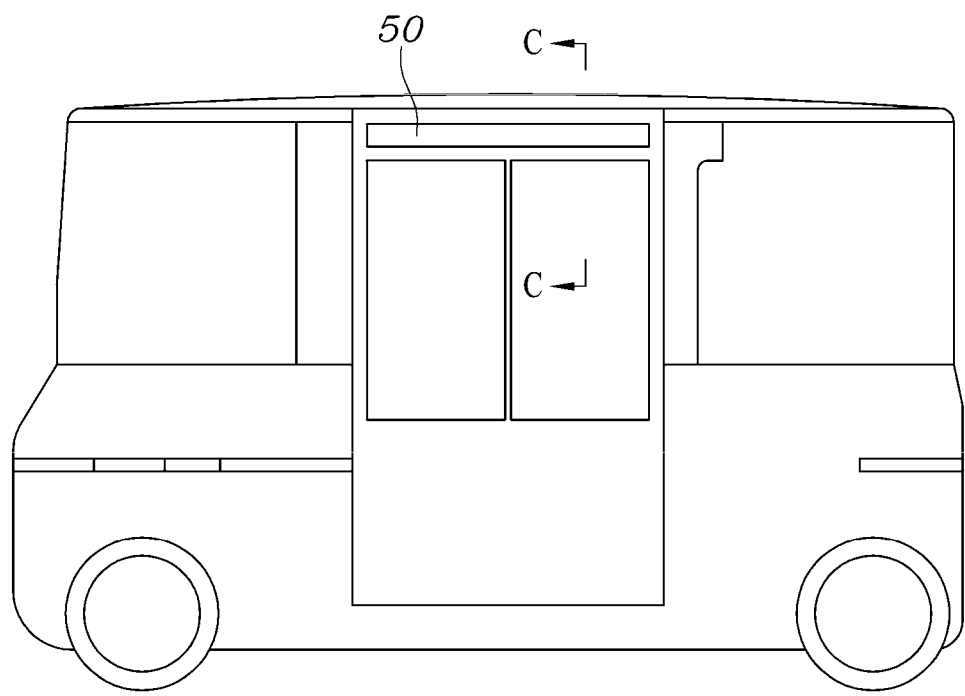
FIG. 7, FIG. 8 and FIG. 9 are views showing a section C-C during rotating of the sealing door according to the exemplary embodiment of the present disclosure toward the vehicle door.
Figure 8:
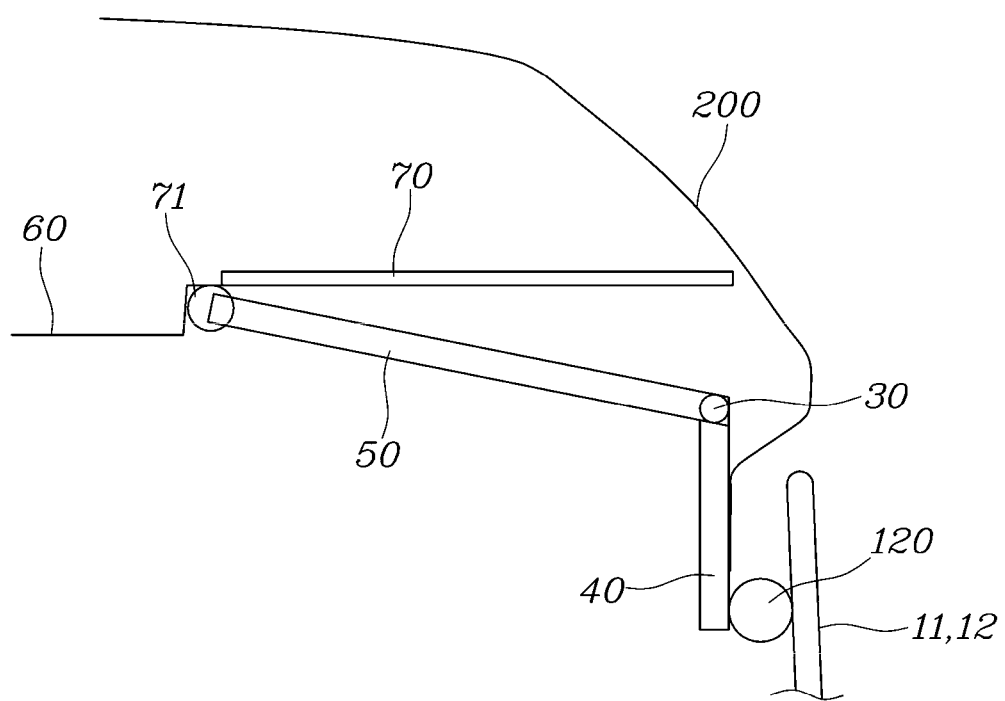
Figure 9:
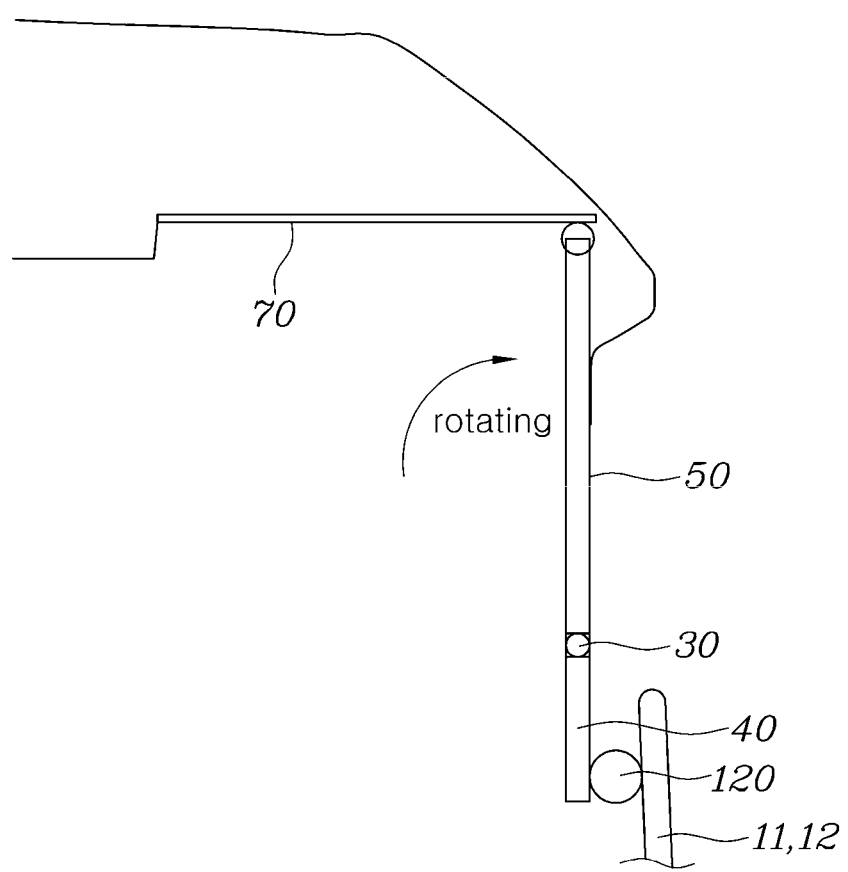

FIG. 6 is a top view showing the docking apparatus of a vehicle and a building in FIG. 2. FIG. 7, FIG. 8 and FIG. 9 are views showing a section C-C during rotating of the sealing door 50 according to the exemplary embodiment of the present disclosure toward the vehicle door 11, 12.

As shown in FIG. 8, the controller allows, when the sealing door 50 is rotated toward the vehicle door 11, 12, the frame fixing pin 41 to be horizontally moved in the lateral direction of the vehicle door 11, 12 to fix the fixed frame 21, and the rotation shaft fixing pin 31 to be horizontally moved toward the vehicle door 11, 12 to release the variable frame 22 from the fixed state. At the present point, during lifting up of the roof 200, while a lower end portion of the sealing door 50 is fixed by the rotation shaft 30, an upper end portion thereof may be linearly moved from the inside space of the vehicle door 11, 12 toward the vehicle door 11, 12 on the rotation shaft 30. Referring to FIG. 6, it is shown that a guide rail is disposed perpendicular to the vehicle door 11, 12. As a roller 71 mounted to the upper end portion of the sealing door 50 is moved along a guide rail 70 mounted to the roof 200, the sealing door 50 may be linearly moved in transverse direction of the vehicle. As shown in FIG. 9, the sealing door 50 is rotated on the rotation shaft 30 and rotated until the sealing door 500 is parallel to the fixed door 40. Here, as the sealing door 50 is parallel to the fixed door 40, the sealed state of the vehicle door 11, 12 and the roof 200 may be maintained.

Based on the structure of the above-described docking system for the vehicle and the building, the docking control method for the vehicle and the building according to an exemplary embodiment will be described with reference to FIG. 10.

FIG. 10 is a view showing a docking control process S1000 of a vehicle and a building according to the exemplary embodiment of the present disclosure.

Referring to FIG. 10, first, the vehicle moves near to the building, at S1010. After that, the controller may be configured to determine whether the vehicle and the building are docked with each other, at S1020. When the controller determines that the vehicle and the building are docked with each other, at YES in S1020, the vehicle may be parked at a regular position for docking in an auto setting, at S1030. On the other hand, the controller is configured to determine that each vehicle door 11, 12 is not docked with the building, at NO in S1020, the vehicle may perform general parking, at S1090. After that, the vehicle may communicate with a sensor of the gate 300 to operate an air suspension by a height H set for docking between the vehicle and the building, at 51040. After that, the controller may be configured to determine a direction in which the vehicle and the building are docked with each other, at S1050. To rotate the sealing door 50 in a non-docking direction, the controller may be configured to control the rotation shaft fixing pin 31 so that the rotation shaft fixing pin 31 is separated, at S1070. The controller may be configured to control the rotation shaft fixing pin 31 in a docking direction so that the rotation shaft fixing pin 31 is maintained in the fixed state, at S1060. After that, the controller lifts the roof 200 regardless of a docking state between the vehicle and the building, so that the indoor space of the vehicle and the indoor space of building are connected to each other into one space, at S1080.

According to an exemplary embodiment of the present disclosure, the detailed technical properties of each stage in the docking control method for the vehicle and the building is same as or similar to the technical properties of each component of the above-described docking system for a vehicle and a building according to an exemplary embodiment of the present disclosure, so detailed descriptions therefor will be omitted.

According to the above-described embodiments of the present disclosure, a docking direction and a non-docking direction in which the vehicle and the building are docked and not docked, and the vehicle door in the docking direction is sealed with the gate of the building and the vehicle door in the non-docking direction is sealed by exposing the sealing door.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A docking system for a vehicle and a building, the docking system comprising:
   a plurality of vehicle doors provided to enter the vehicle;
   a roof connected to an upper portion of each of the vehicle doors, and configured to be vertically lifted and lowered above and below the plurality of vehicle doors, wherein when the roof is lifted, an indoor space of the vehicle expands upward to connect the indoor space of the vehicle to an indoor space of the building into one space; and
   a sealing door respectively provided inside each of the vehicle doors, wherein when the roof is lifted, the sealing door is rotated toward each of the vehicle doors to seal each of the vehicle doors and the roof.

2. The docking system of claim 1, further including:
   a controller configured to control each of the vehicle doors, the roof, and the sealing door.

3. The docking system of claim 2, wherein the controller is configured to determine a direction in which the vehicle and the building are docked with each other, and to rotate the sealing door in a non-docking direction.

4. The docking system of claim 3, wherein the controller is configured to lift the roof while closing the sealing door in a docking direction of the vehicle and the building.

5. The docking system of claim 1, further including:
   a fixed door provided inside the vehicle door, and connected to each sealing door via a rotation shaft at a lower end portion of the sealing door;
   a fixed frame provided at a lateral portion of the vehicle door, and including an internal space; and
   a variable frame slidably coupled to an upper portion of the fixed frame and configured to slide vertically above and below the fixed frame, wherein when the variable frame slides upward, the roof is lifted and the indoor space expands upwards.

6. The docking system of claim 5, wherein, when the roof is lifted up, while a lower end portion of the sealing door is fixed via the rotation shaft, an upper end portion thereof is linearly moved in a direction from the inside space of each of the vehicle doors toward each of the vehicle doors on the rotation shaft.

7. The docking system of claim 5, further including:
   a hydraulic cylinder provided in the internal space of the fixed frame, and provided below the variable frame,
   wherein the hydraulic cylinder is configured to allow the variable frame to slide vertically above and below the fixed frame.

8. The docking system of claim 5, further including:
   a frame fixing pin inserted in the fixed door to be horizontally moved in a lateral direction of the vehicle door, and configured to fix the fixed frame or to release the fixed frame from a fixed state; and
   a rotation shaft fixing pin inserted in the rotation shaft to be horizontally moved in a lateral direction of each of the vehicle doors, and configured to fix the variable frame or to release the variable frame from a fixed state.

9. The docking system of claim 8, wherein the controller is configured to control the frame fixing pin and the rotation shaft fixing pin.

10. The docking system of claim 9, wherein, when the sealing door is rotated toward each of the vehicle doors, the controller is configured to allow the frame fixing pin to be horizontally moved in the lateral direction of each of the vehicle doors to fix the fixed frame, and the controller is configured to allow the rotation shaft fixing pin to be horizontally moved toward each of the vehicle doors to release the variable frame from the fixed state.

11. The docking system of claim 9, wherein, when the sealing door is closed, the controller is configured to allow the frame fixing pin to be horizontally moved toward each of the vehicle doors to release the fixed frame from the fixed state and allows the rotation shaft fixing pin to be horizontally moved in the lateral direction of each of the vehicle doors to fix the variable frame.

12. The docking system of claim 5, further including:
    a guide rail mounted perpendicular to the vehicle doors on the roof of the vehicle;
    wherein an upper end portion of the sealing door is engaged to the guide rail and moved along the guide rail, and
    wherein a lower end portion of the sealing door is rotatably coupled to the rotation shaft.

13. The docking system of claim 12,
    wherein the sealing door is linearly movable in a transverse direction of the vehicle, and
    wherein the sealing door is rotated on the rotation shaft until the sealing door is parallel to the fixed door.

14. A docking control method for a vehicle and a building, the docking control method comprising:
    receiving, by a controller, a docking request of the vehicle while parking of the vehicle is completed;
    determining, by the controller, a direction in which the vehicle and the building are docked with each other, according to the received docking request;
    connecting, by the controller, an indoor space of the vehicle to an indoor space of the building into one space by lifting a roof of the vehicle so that the indoor space of the vehicle expands upward, while a sealing door in a docking direction of the vehicle and the building is closed; and
    sealing, by the controller, a vehicle door and the roof by rotating the sealing door in a non-docking direction of the vehicle and the building toward the vehicle door.

15. The docking control method of claim 14, further including:
    a fixed door provided inside the vehicle door, and connected to each sealing door via a rotation shaft at a lower end portion of the sealing door;
    a fixed frame provided at a lateral portion of the vehicle door, and including an internal space; and
    a variable frame slidably coupled to an upper portion of the fixed frame and configured to slide vertically above and below the fixed frame, wherein when the variable frame slides upward, the roof is lifted and the indoor space expands upwards.

16. The docking control method of claim 15, further including:
    a guide rail mounted perpendicular to the vehicle door on the roof of the vehicle;
    wherein an upper end portion of the sealing door is engaged to the guide rail and moved along the guide rail,
    wherein a lower end portion of the sealing door is rotatably coupled to the rotation shaft.

17. The docking control method of claim 16,
    wherein the sealing door is linearly movable in a transverse direction of the vehicle, and
    wherein the sealing door is rotated on the rotation shaft until the sealing door is parallel to the fixed door.

18. The docking control method of claim 15, further including:
- a frame fixing pin inserted in the fixed door to be horizontally moved in a lateral direction of the vehicle door, and configured to fix the fixed frame or to release the fixed frame from a fixed state; and
- a rotation shaft fixing pin inserted in the rotation shaft to be horizontally moved in a lateral direction of the vehicle door, and configured to fix the variable frame or to release the variable frame from a fixed state.

19. The docking control method of claim 15, wherein the connecting, by the controller, the indoor space of the vehicle to the indoor space of the building into the one space includes:
- allowing, by the controller, when the sealing door rotates toward the vehicle door, the frame fixing pin to be horizontally moved in a lateral direction of the vehicle door to fix the fixed frame; and
- allowing, by the controller, the rotation shaft fixing pin to be horizontally moved toward the vehicle door to release the variable frame from a fixed state.

20. The docking control method of claim 15, wherein the sealing, by the controller, the vehicle door and the roof includes:
- allowing, by controller, when the sealing door is closed, the frame fixing pin to be horizontally moved toward the vehicle door to release the fixed frame from a fixed state; and
- allowing, by controller, the rotation shaft fixing pin to be horizontally moved in a lateral direction of the vehicle door to fix the variable frame.

\* \* \* \* \*